(12) United States Patent  
Kerfoot, III et al.

(10) Patent No.: US 6,999,683 B2
(45) Date of Patent: Feb. 14, 2006

(54) OPTICAL FIBER TRANSMISSION SYSTEM WITH NOISE LOADED IDLER CHANNELS

(75) Inventors: Franklin W. Kerfoot, III, Red Bank, NJ (US); Matthew X. Ma, Morganville, NJ (US); Mark D. Tremblay, Neptune, NJ (US); Wolfgang Schlosser, Fair Haven, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 48 days.

(21) Appl. No.: 10/748,596

(22) Filed: Dec. 30, 2003

(65) Prior Publication Data

US 2004/0151502 A1    Aug. 5, 2004

Related U.S. Application Data

(63) Continuation of application No. 09/534,580, filed on Mar. 27, 2000, now Pat. No. 6,704,511.

(51) Int. Cl.
*H04J 14/02* (2006.01)
*H04B 10/12* (2006.01)
*H04B 10/00* (2006.01)
*G02B 6/26* (2006.01)
*G02B 6/42* (2006.01)

(52) U.S. Cl. ................ 398/85; 398/79; 398/149; 398/158; 385/15; 385/27

(58) Field of Classification Search ............ 398/79, 398/85, 149, 158; 385/15, 27, 31, 39
See application file for complete search history.

(56) References Cited

U.S. PATENT DOCUMENTS

| 4,945,531 | A | * | 7/1990 | Suzuki ...................... 398/91 |
| 5,726,784 | A | * | 3/1998 | Alexander et al. ............ 398/91 |
| 6,256,138 | B1 | * | 7/2001 | Huang ..................... 359/337.2 |
| 6,704,511 | B1 | * | 3/2004 | Kerfoot et al. ............... 398/85 |

* cited by examiner

*Primary Examiner*—M. R. Sedighian
(74) *Attorney, Agent, or Firm*—Grossman, Tucker, Perreault & Pfleger, PLLC

(57) ABSTRACT

A wavelength division multiplex optical system includes a WDM combiner to provide a source signal, at least one transmitter coupled to an input of the WDM combiner, a broadband noise source, and a filter coupled between the broadband noise source and another input of the WDM combiner. In one embodiment, the filter is an optical notch filter. In an alternative embodiment, the filter includes a WDM demultiplexer coupled through plural filters to provide a plurality of noise signals and a WDM multiplexer coupled through at least one filter of the plural filters to respective noise signals.

32 Claims, 4 Drawing Sheets

OPTICAL FIBER TRANSMISSION SYSTEM WITH NOISE LOADED IDLER CHANNELS

CROSS REFERENCE TO RELATED APPLICATIONS

This application is a continuation of U.S. application Ser. No. 09/534,580, filed Mar. 27, 2000, now U.S. Pat. No. 6,704,511, the teachings of which are incorporated herein by reference.

BACKGROUND OF THE INVENTION

1. Field of the Invention

The present invention relates to a head end of an optical fiber network that carries multiple optical signals in corresponding channels using a wavelength division multiplex channel structure. In particular, the invention relates to an apparatus and method for loading unutilized channels with noise so that information signals on utilized channels will not draw all of the power from optically pumped fiber amplifiers in repeaters of the optical fiber network.

2. Description of Related Art

Undersea communication network systems require repeaters periodically spaced to compensate for attenuation in the signal transmission medium. Optical fiber networks include repeaters connected between links of optical fiber cable. The optical fiber cables include one or more optical fibers and often include conductive wires (e.g., copper wires) to deliver power to the repeaters.

In order to maximize the transmission capacity of an optical fiber network, a single fiber is used to carry multiple optical signals in what is called a wavelength division multiplex system (hereinafter a WDM system). For example, a single optical fiber might carry 32 individual optical signals at corresponding wavelengths evenly spread between 1541 and 1589 nanometers (e.g., spread in channels on 1.5 nanometer centers). For example, a first information signal may be formed using on-off keying (OOK) of an optical signal at a wavelength of 1542.5 nanometers; a second information signal may be formed using on-off keying of an optical signal at a wavelength of 1544 nanometers; a third information signal may be formed using on-off keying of an optical signal at a wavelength system, a signal fiber will carry thirty-two (32) information signals spread in wavelength over the band between 1541 and 1589 nanometers.

Modern undersea WDM systems have a high traffic capacity, for example, a capacity to carry 32 channels of 10 gigabits per second (hereinafter Gb/s). When an undersea optical link is initially deployed, the link may be only partially loaded. Initially only a few of the 32 potential channels may be used to carry information signals of 10 Gb/s.

Repeaters as used in WDM systems that are deployed under the sea cannot easily be modified, and the repeater must be sized initially to support a fully loaded link (e.g., 32 channels, each channel carrying 10 Gb/s). A representative undersea repeater might be designed to provide an optical output signal at a nominal optical power of, for example, 32 milliwatts. The nominal output power level is insensitive to the power at the input of the amplifier. As the input power varies over a wide range, the output power changes very little around this nominal output power level. Thus, when the optical link is fully loaded with 32 channels, each channel will be amplified in the repeater to an optical output power of one (1.0) milliwatt per channel. However, if the initially deployed system uses only two channels for information, information signals on these two channels will draw all of the power from the optically pumped fiber amplifier, and the repeater will provided an output signal power of 16 milliwatts for each of the two channels (i.e., half of the 32 milliwatt output power of the repeater). As additional channels are added, the optical output power per channel will become reduce from 16 milliwatts to 1.0 milliwatts when the fiber link is fully loaded.

In a fiber optic network, the fiber medium itself is non-linear. This nonlinearity interacts with the dispersion of the fiber, and degrades the network performance. At high optical powers (e.g., more than 10 milliwatts per channel), the optical signal experiences more distortion than at low optical powers (e.g., less than 1.0 milliwatt per channel). Since the in-line repeaters of the network that are deployed undersea have a substantially constant output power level (e.g., total power of all channels), the optical power per channel at initial deployment is much higher than the optical power per channel in a fully loaded optical network. As a result of the nonlinearity, the network communication performance at initial deployment could be worse than the performance when the network is fully loaded.

SUMMARY OF THE INVENTION

It is an object to the present invention to overcome limitations in the prior art. It is another object to provide a system and method for transmitting signals that accommodates utilization growth from initial deployment to full utilization. It is yet another object to provide a transmitter that accommodates utilization growth from initial deployment to full utilization These and other objects are achieved in a wavelength division multiplex optical system that includes a WDM combiner to provide a source signal, at least one transmitter coupled to an input of the WDM combiner, a broadband noise source, and a filter coupled between the broadband noise source and another input of the WDM combiner. In one embodiment of the invention, the filter is an optical notch filter. In an alternative embodiment, the filter includes a WDM demultiplexer coupled through plural filters to provide a plurality of noise signals and a WDM multiplexer coupled through at least one filter of the plural filters to respective noise signals.

In yet another an alternative embodiment of the invention, the invention is a method of providing a source signal that includes steps of transmitting information in at least one information signal, filtering noise from a broadband noise source to provide a filtered noise signal, and combining the filtered noise signal and the at least one information signal into the source signal. In one variant of the method, the step of filtering includes blocking optical signals at wavelengths within a stop band with an optical notch filter while passing optical signals at wavelengths not within the stop band. In an alternative variant of the method, the step of filtering includes demultiplexing the noise from the broadband noise source into a plurality of noise signals ordered according to wavelength and multiplexing at least one of the plurality of noise signals to provide the filtered noise signal.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
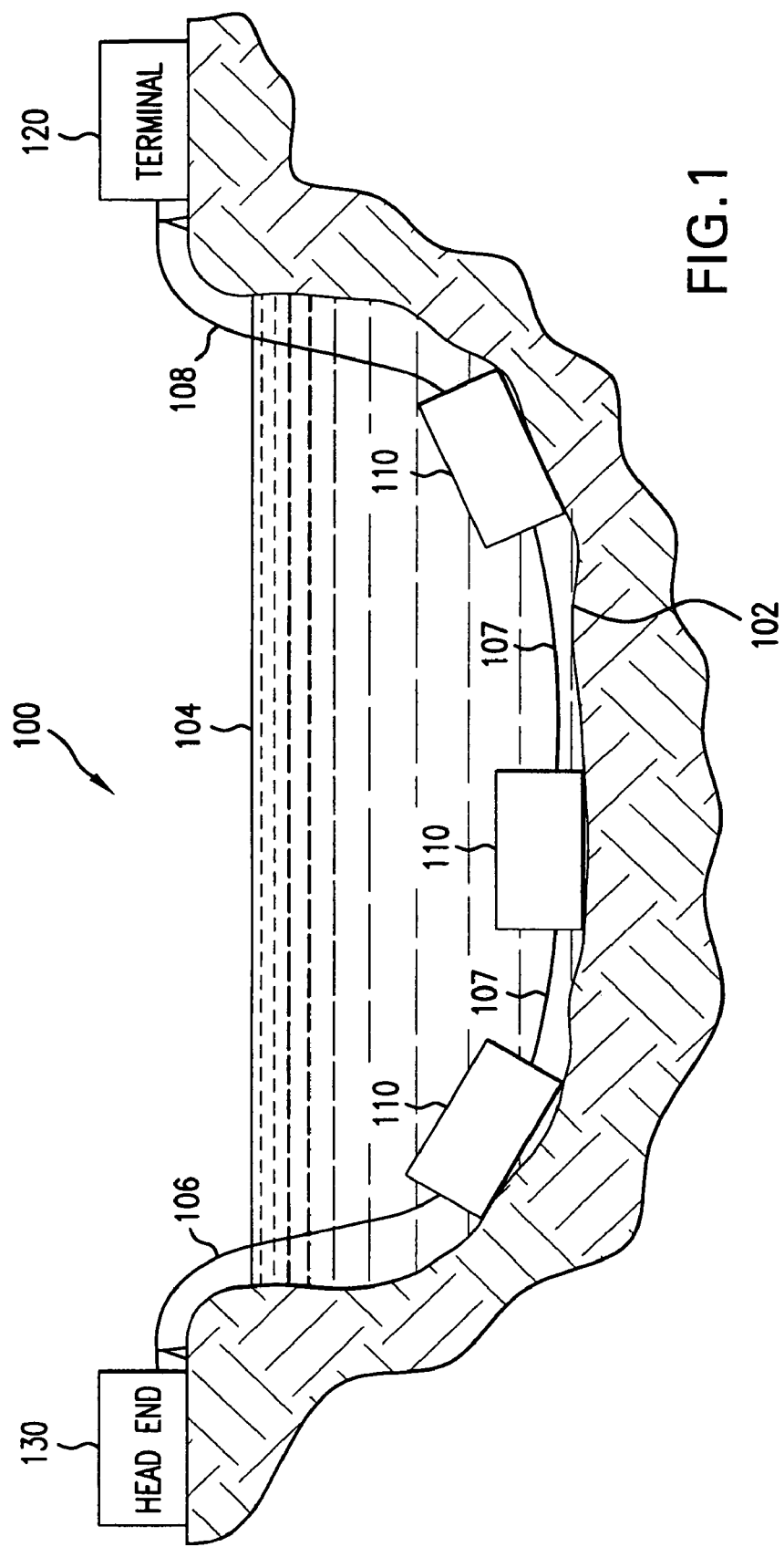
FIG. 1 is a schematic representation of a communication system of the present invention.

In FIG. 1, optical network 100 includes head end 130 providing a source signal on head end optical cable 106. Optical cable 106 is linked via a plurality of repeaters 110 (including optical amplifiers) and linking optical cables 107 to provide the source signal to terminal 120 over terminal optical cable 108. Network 100 might be a part of a digitized voice or data communications system. The communication systems may, or may not, be employed to span body of water 104. When used to span a body of water, amplifier 110 is often seated on bottom 102 of the water and the input and output optical media span between beach landings. However, it will be appreciated that plural repeater and optical media links may be disposed beneath the water or over land.

Figure 2:
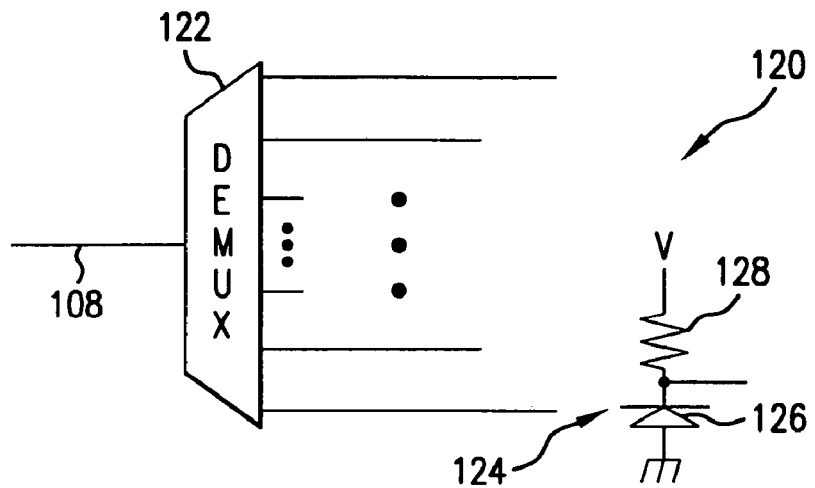
FIG. 2 is a schematic diagram of a terminal end of the system of FIG. 1.

In FIG. 2, terminal 120 of network 100 is a wavelength division multiplex terminal (a WDM terminal) that includes wavelength demultiplexer 122 to divide terminal input signals received over terminal cable 108 into individual wavelength separated optical signals. In FIG. 2, separated optical signal 124 is focused on photodiode 126 in a circuit arrangement with resistor 128 to provide an electrical signal that corresponds to the optical signal carried in one optical channel on terminal optical cable 108. A detector circuit (e.g., photodiode 126 and resistor 128) is used for each active channel in WDM terminal 120. Persons skilled in the art will appreciate that there are many equivalent detector circuits, for example, a photo transistor or photo gate my be substituted for photodiode 126.

Figure 3:
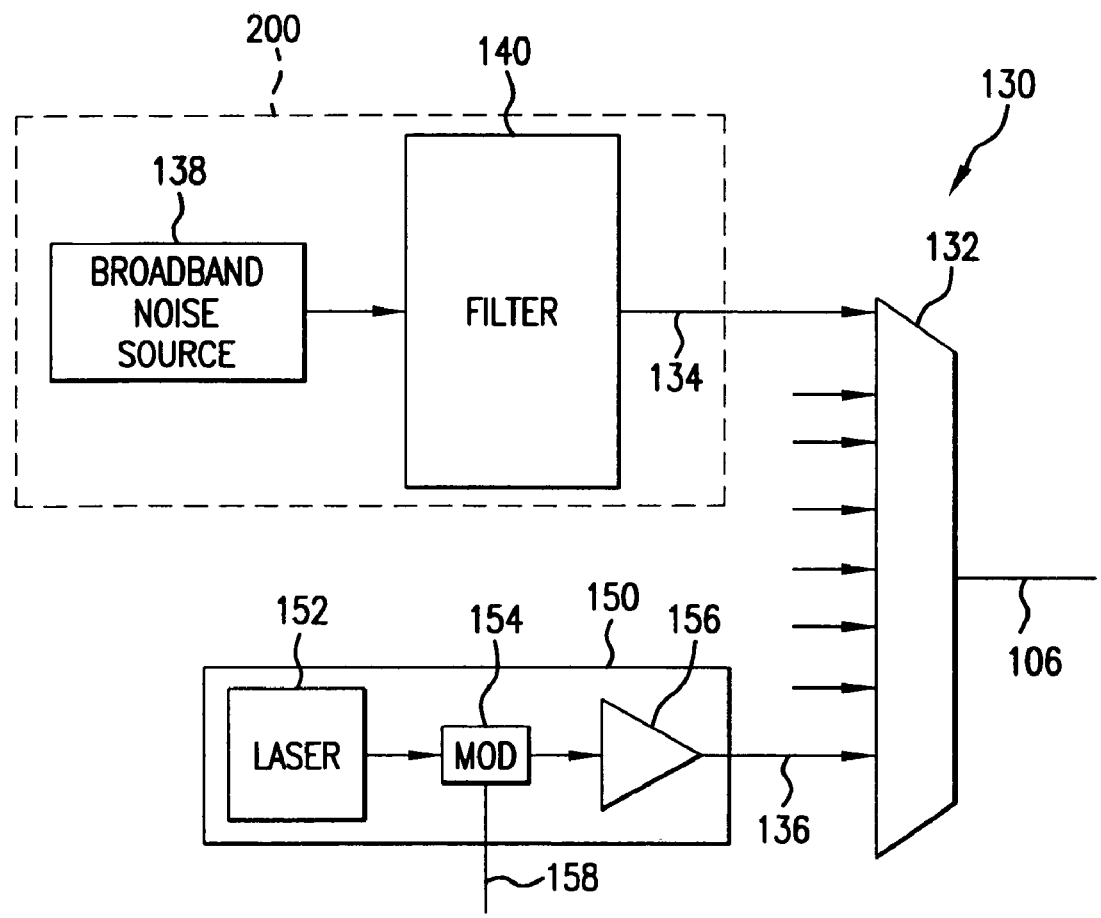
FIG. 3 is a schematic diagram of a head end of the system of FIG. 1 showing noise loaded idler channel equipment according to the present invention.

In FIG. 3, head end 130 of network 100 is a wavelength division multiplex head end (a WDM head end) that includes combiner 132 to produce the source signal to be carried on head end optical cable 106. FIG. 3 also depicts noise loaded idler channel equipment 200 that is typically not part of head end 130 of network 100. Combiner 132 combines filtered noise signals carried on filter output optical cable 134 and information signals carried on one or more transmitter optical cables 136. Head end 130 includes broadband noise source 138 coupled through filter circuitry 140 to filter output optical cable 134. Broadband noise source 138 is any known broadband noise source. For example, an EDFA of the type used in repeaters 110 may be used for generating broadband noise in the absence of input to the EDFA. Preferably, broadband noise source 138 includes an equalizer at its output so that the spectral power density of the optical noise signal is equal at every wavelength across the bandwidth of network 100.

Head end 130 also includes one or more transmitters 150. Transmitter 150 includes laser source 152 coupled through modulator 154 to amplifier 156. Modulator 154 may be an electro-optical modulator of known type or an electro-acoustic modulator of known type. In either event, modulator 154 modulates the optical output signal from laser source 152 based on electrical information (e.g., a bit stream) on modulator control input line 158. For example, a bit stream of data may be encoded into a return to zero electrical signal (RZ signal). A "one" is represented by 5 volts, and a "zero" is represented by 0 volts. Modulator 154 modulates the output from laser source 152 to be optically "off" when the modulation signal is a "zero" and optically "on" when the modulation signal is a "one." Persons skilled in the art will appreciate that other types of transmitter may be used to translate electrical signals on modulator control input line 158 into optical information signals on transmitter optical cable 136.

A wavelength division multiplex system (a WDM system) is frequently used to achieve a high capacity network, but when initially installed, only one or a few of the wavelength division channels are used to transmit information signals.

In this invention, head end 130 provides a source signal that combines information signals and filtered noise signals. The information signals come from one or more transmitters 150 on utilized wavelength channels of network 100. At the same time, the filtered noise signals come from noise source 138 through filter circuitry 140. The filter blocks optical signals at wavelengths that correspond to the wavelengths of information signals from transmitters 150 so noise is not added to the desired information signals. However, the filter passes optical signals (e.g., noise signals from broadband noise source 138) at wavelengths not within the stop band.

By loading unutilized channels (called idler channels) with noise signals, the information signals on utilized channels will not draw all of the power from optically pumped fiber amplifiers in repeaters 110. Instead, the noise signals carried in the idler channels will draw their proportionate share of the repeater's power as if they were information signals. In this way, all WDM channels will appear to be fully loaded from the initial operation, even if some of the channels are loaded with noise.

As more capacity is needed from network 100, additional transmitters 150 are added and filter circuitry 140 is modified or replaced so as to block optical signals at the wavelengths of the information signals provided by transmitters 150. In this way, noise is not added to the desired information signals.

Figure 4:
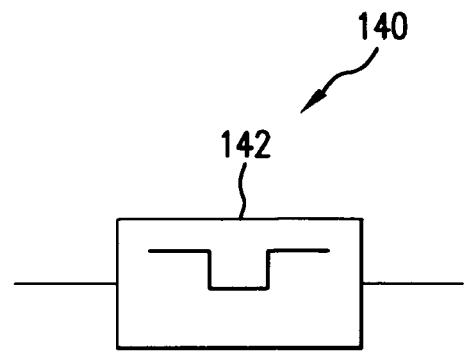
FIG. 4 is a schematic diagram of a filter of the head end of FIG. 3.
Figure 6:
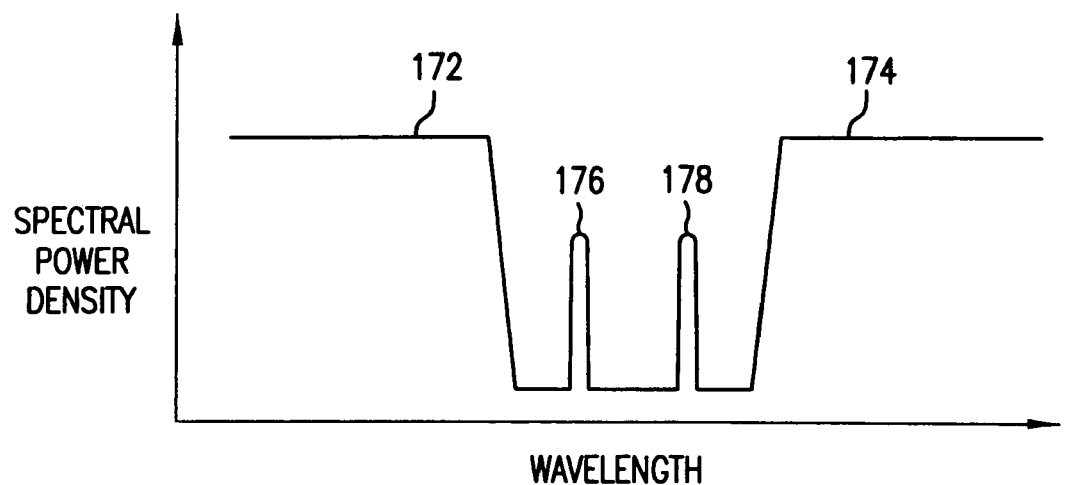
FIG. 6 is a graph depicting the output spectral power density of the head end of FIG. 3 when using the filter of FIG. 4.

In FIG. 4, a first embodiment of filter circuitry 140 includes optical notch filter 142. Optical notch filter 142 is characterized by a stop band that blocks signals at wavelengths corresponding to each information signal that is provided by any of transmitters 150. At the same time, the optical notch filter passes optical signals at wavelengths not within the stop band (i.e., the pass band). FIG. 6 is a graph of the spectral power density of the source signal on head end optical cable 106. The noise signal from broadband noise source 138 is blocked by optical notch filter 142 at wavelengths close to information signals 176 and 178 (from two transmitters 150) so that the information signals will not be degraded in noise. However, at wavelengths far distant from information signals 176 and 178, optical notch filter 142 passes the noise signals in its pass band as idler signals 172 and 174.

Figure 5:
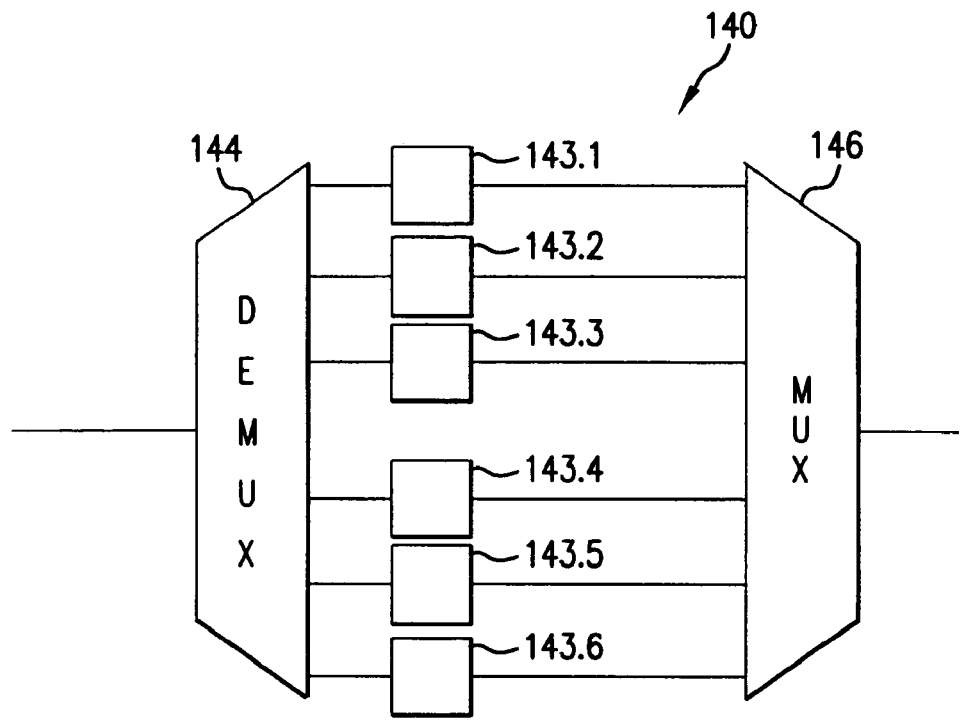
FIG. 5 is a schematic diagram of an alternative filter of the head end of FIG. 3.
Figure 5B:
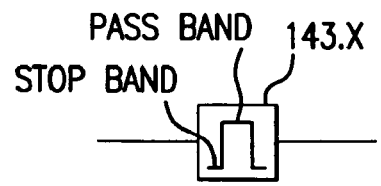

In FIG. 5, a second embodiment of filter circuitry 140 includes wavelength demultiplexer 144, wavelength multiplexer 146 and bandpass filters 143.x (where x=1, . . . 6 in FIG. 5) coupled therebetween with the filter shape indicated in FIG. 5B. Wavelength demultiplexer 144 separates the broadband noise signal from broadband noise source 138 into plural noise signals. The bandpass filter wavelengths correspond to idler channels to be loaded with noise. Wavelength multiplexer 146 combines a noise signal at each wavelength that does not corresponding to an information signal. When additional signal wavelengths are added in the future, one or more paths between demultiplexer 144 and multiplexer 146, that correspond to the added signal wavelengths, are simply removed.

Figure 7:
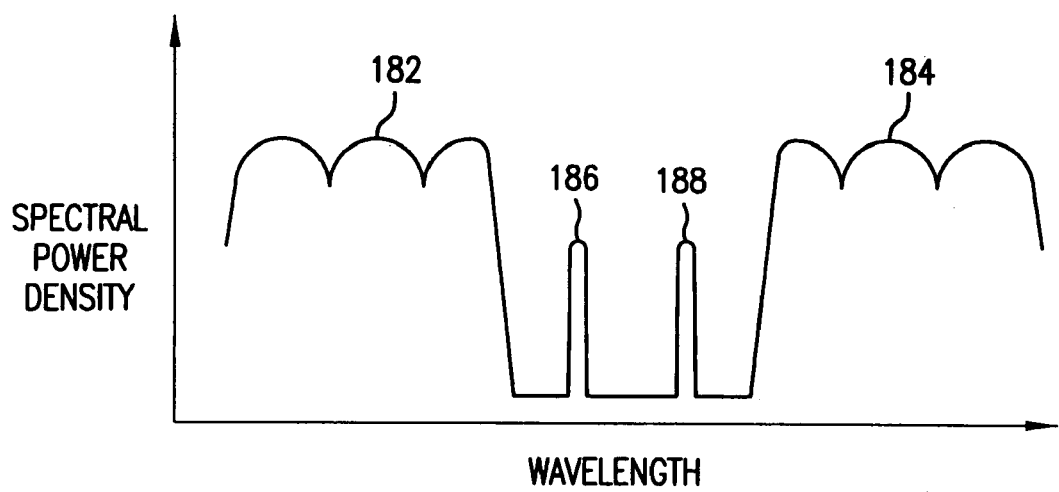
FIG. 7 is a graph depicting the output spectral power density of the head end of FIG. 3 when using the filter of FIG. 5.

FIG. 7 is a graph of the spectral power density of the source signal on head end optical cable 106. Signal channel wavelengths are indicated at 186 and 188, while 182 and 184 indicate noise loaded idler channels.

Having described preferred embodiments of a novel extended band erbium doped fiber amplifier (which are intended to be illustrative and not limiting), it is noted that modifications and variations can be made by persons skilled in the art in light of the above teachings. For example, the optical amplifier may be achieved in any number of stages with an equalizer between stages. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A wavelength division multiplex (WDM) optical system comprising:
   a WDM combiner to provide a source signal;
   at least one transmitter coupled to the WDM combiner, said at least one transmitter providing a corresponding information signal;
   a noise source; and
   at least one filter coupled between said noise source and said WDM combiner, said filter being characterized by at least one stop band that blocks a wavelength corresponding to said corresponding information signal and at least one pass band that passes wavelengths not within the at least one stop band.

2. The system of claim 1, wherein said noise source is a broadband noise source.

3. The system of claim 1, wherein said filter comprises an optical notch filter.

4. The system of claim 1, wherein the filter comprises:
   a WDM demultiplexer to provide a plurality of noise signals;
   a plurality of filters, each filter coupled to a respective noise signal of the plurality of noise signals; and
   a WDM multiplexer coupled through at least one filter of the plurality of filters to respective noise signals.

5. The system of claim 1, wherein said WDM multiplexer is configured for selective decoupling from at least one of said respective noise signals.

6. The system of claim 1, wherein the filter includes:
   a WDM demultiplexer to provide noise signals at a plurality of wavelengths; and
   a WDM multiplexer coupled to combine a zero signal at wavelengths corresponding to each information signal that is provided by a transmitter of the at least one transmitter, the WDM multiplexer being further coupled to combine a noise signal at each wavelength of the plurality of wavelengths not corresponding to an information signal that is provided by a transmitter of the at least one transmitter.

7. The system of claim 1, further comprising:
   an amplifier; and
   an optical cable coupled to carry said source signal to the amplifier.

8. The system of claim 1, further comprising:
   a plurality of linked amplifiers; and
   an optical cable coupled to carry said source signal to a fist one of said linked amplifiers.

9. The system of claim 1, wherein said noise source comprises an Erbium Doped Fiber Amplifier.

10. The system of claim 1, wherein said noise source comprises means for providing a substantially constant spectral power density across a range of wavelengths in an output of said noise source.

11. A WDM system configured for communicating a predetermined number of optical channel wavelengths, said predetermined number of optical channel wavelengths including a first number of utilized channel wavelengths and a second number of idler channel wavelengths, said system comprising:
    at least one transmitter, said transmitters providing an associated information signal on an associated one of said utilized channel wavelengths;
    at least one noise source;
    at least one filter coupled to said noise source; said filter providing at least one noise signal, on an associated one of said idler channel wavelengths; and
    at least one WDM combiner for combining said associated information signal and said associated noise signal into a source signal.

12. The system of claim 11, wherein said at least one filter provides a noise signal on each of said second number of idler channel wavelengths.

13. The system of claim 11, said system further comprising:
    a transmission path for receiving said source signal; and
    at least one amplifier coupled to said transmission path, said amplifier being configured to amplify said predetermined number of channel wavelengths.

14. The system of claim 13, wherein said at least one filter provides a noise signal on each of said second number of idler channel wavelengths.

15. The system of claim 13, said system comprising a plurality of said transmitters, each said transmitters providing an information signal on an associated one of said first number of utilized channel wavelengths.

16. The system of claim 11, wherein said noise source is a broadband noise source.

17. The system of claim 11, wherein said filter comprises an optical notch filter.

18. The system of claim 11, wherein the filter comprises:
    a WDM demultiplexer to provide a plurality of said noise signals;
    a plurality of filters, each filter coupled to a respective noise signal of the plurality of said noise signals; and
    a WDM multiplexer coupled trough at least one filter of the plurality of filters to respective noise signals.

19. The system of claim 11, wherein the filter includes:
    a WDM demultiplexer to provide a plurality of said noise signals each at one of a plurality of wavelengths; and
    a WDM multiplexer coupled to combine a zero signal at wavelengths corresponding to each said information signal that is provided by a transmitter of the at least one transmitter, the WDM multiplexer being further coupled to combine each said noise signal at each wavelength of the plurality of wavelengths not corresponding to an information signal that is provided by a transmitter of the at least one transmitter.

20. The system of claim 11, wherein said noise source comprises an Erbium Doped Fiber Amplifier.

21. The system of claim 11, wherein said noise source comprises means for providing a substantially constant spectral power density across a range of wavelengths in an output of said noise source.

22. A method of providing a source signal in a wavelength division multiplex system, the source signal including a first number of utilized channel wavelengths and a second number of idler channel wavelengths, said method comprising:
   providing at least one information signal on an associated one of said utilized channel wavelengths;
   filtering noise from a noise source to provide at least one filtered noise signal on an associated one of said idler channel wavelengths; and
   combining said at least one noise signal and said at least one information signal into the source signal.

23. The method of claim 22, said method comprising providing a plurality of said filtered noise signals, each on an associated one of said idler channel wavelengths.

24. The method of claim 22, said method comprising providing a plurality of said information signals, each on an associated one of said utilized channel wavelengths.

25. The method of claim 22, said method comprises providing a plurality of said information signals, each on an associated one of said utilized channel, wavelengths and providing a plurality of said filtered noise signals, each on an associated one of said idler channel wavelengths.

26. The method of claim 22, wherein said first number of utilized channel wavelengths is less than a total number of channel wavelengths amplified by an optical amplifier in said system.

27. The method of claim 22, said method further comprising:
   removing said at least one filtered noise signal from said associated one of said idler channel wavelengths;
   adding an additional information signal to the system on said associated one of said idler channel wavelengths.

28. The method of claim 22, wherein said noise source is a broadband noise source.

29. The method of claim 22, wherein said filtering includes blocking signals at wavelengths within a stop band while passing optical signals at wavelengths not within the stop band.

30. The method of claim 22, wherein said filtering includes:
   demultiplexing said noise from said noise source into a plurality of said noise signals ordered according to wavelength; and
   multiplexing at least one of said plurality of noise signals to provide said filtered noise signal.

31. The method of claim 22, wherein said filtering includes:
   demultiplexing said noise from said noise source into noise signals at a plurality of wavelengths; and
   multiplexing a portion of said noise signals and a zero optical signal to become said filtered noise signal, said multiplexing comprising combining the zero optical signal at wavelengths corresponding said at least one information signal and combining said at least one noise signal at a wavelength of the plurality of wavelengths not corresponding to said at least one information signal.

32. The method of claim 22, further comprising:
   coupling the source signal over an optical cable to an amplifier for amplifying the source signal.

* * * * *